United States Patent
Muratov

(10) Patent No.: US 10,483,804 B2
(45) Date of Patent: Nov. 19, 2019

(54) MONOTONIC WIRELESS POWER TRANSFER

(71) Applicant: MediaTek Inc., Hsin-Chu (TW)

(72) Inventor: Vladimir A. Muratov, Manchester, NH (US)

(73) Assignee: MediaTek Inc., Hsin-Chu (TW)

( * ) Notice: Subject to any disclaimer, the term of this patent is extended or adjusted under 35 U.S.C. 154(b) by 197 days.

(21) Appl. No.: 15/481,341

(22) Filed: Apr. 6, 2017

(65) Prior Publication Data

US 2017/0353053 A1 Dec. 7, 2017

Related U.S. Application Data

(60) Provisional application No. 62/346,599, filed on Jun. 7, 2016.

(51) Int. Cl.
| | |
|---|---|
| *H02J 50/12* | (2016.01) |
| *H02J 50/40* | (2016.01) |
| *H02J 7/02* | (2016.01) |

(52) U.S. Cl.
CPC .............. *H02J 50/12* (2016.02); *H02J 7/025* (2013.01); *H02J 50/40* (2016.02)

(58) Field of Classification Search
CPC ............. H02J 50/12; H02J 7/025; H02J 50/40
See application file for complete search history.

(56) References Cited

U.S. PATENT DOCUMENTS

| | | |
|---|---|---|
| 2005/0152463 A1 | 7/2005 | DeChamps et al. |
| 2014/0152250 A1* | 6/2014 | Vijayan ............... H02J 17/00 320/108 |
| 2016/0072309 A1* | 3/2016 | Chu .................. H02J 50/12 307/104 |
| 2017/0201128 A1* | 7/2017 | Jung .................. H02J 50/40 |
| 2017/0346346 A1* | 11/2017 | Shimokawa ............ H02J 50/80 |

FOREIGN PATENT DOCUMENTS

| | | |
|---|---|---|
| CN | 1653709 A | 8/2005 |
| CN | 101155198 A | 4/2008 |
| TW | 181422 B | 4/1992 |
| WO | WO 2015/170175 A1 | 11/2015 |

OTHER PUBLICATIONS

Extended European Search Report for European Application No. 17174775.1 dated Nov. 3, 2017.

* cited by examiner

*Primary Examiner* — Jared Fureman
*Assistant Examiner* — Duc M Pham
(74) *Attorney, Agent, or Firm* — Wolf, Greenfield & Sacks, P.C.

(57) ABSTRACT

At least one component for a wireless power transmitter or a wireless power receiver. The at least one component includes a mechanical structure and/or circuitry configured to maintain and/or adjust a coupling coefficient K between the wireless power transmitter and the wireless power receiver, a loaded quality factor Q of the wireless power receiver, or both, such that K times Q is less than a constant.

23 Claims, 10 Drawing Sheets

MONOTONIC WIRELESS POWER TRANSFER

CROSS REFERENCE TO RELATED APPLICATIONS

This application claims the benefit of U.S. Provisional Application No. 62/346,599, which was filed on Jun. 7, 2016, and which is incorporated herein by reference in its entirety.

BACKGROUND

1. Technical Field

The techniques described herein relate generally to wireless power transmission.

2. Discussion of the Related Art

Wireless Power Transfer Systems (WPTS) are gaining increasing popularity as a convenient way to deliver power without wires or connectors. WPTS currently under development in the industry can be separated in two major classes: magnetic induction (MI) systems and magnetic resonance (MR) systems. Both types of systems include a wireless power transmitter (WPT) and a wireless power receiver (WPR). Such systems can be used to power or charge mobile devices such as smartphones or tablet computers, among other applications.

Some inductive WPTS typically operate in an allocated frequency range of several hundred kilohertz using frequency variation as a power flow control mechanism.MR WPTS typically operate on a single resonant frequency using input voltage regulation to regulate output power. In typical applications, MR WPTS operate at a frequency of 6.78 MHz. Industry committees have been working on developing international standards for consumer products based on wireless power transfer.

SUMMARY

Some embodiments relate to at least one component for a wireless power transmitter or a wireless power receiver. The at least one component includes a mechanical structure and/or circuitry configured to maintain and/or adjust a coupling coefficient K between the wireless power transmitter and the wireless power receiver, a loaded quality factor Q of the wireless power receiver, or both, such that K times Q is less than a constant.

The at least component may comprise circuitry configured to measure an electrical characteristic of the wireless power receiver and to adjust Q based on the electrical characteristic.

The circuitry may comprise a current measurement device, a voltage measurement device, or both.

The least one component may comprise circuitry that is configured to adjust Q by adjusting a capacitance, inductance, resistance, and/or loading of the wireless power receiver.

The circuitry may be configured to adjust the capacitance by controlling a variable capacitance of the wireless power receiver.

The circuitry may be configured to adjust the inductance by controlling a variable inductance of the wireless power receiver.

The circuitry may be configured to adjust the resistance by controlling a variable equivalent resistance of the wireless power receiver.

The circuitry may be configured to adjust the transmitter operating frequency.

The constant may be between 0.8 and 1.0, inclusive.

The mechanical structure and/or circuitry may be configured to maintain and/or adjust K, Q or both such that a transfer function from the wireless power transmitter to the wireless power receiver is monotonic within a range of drive frequencies of the wireless power transmitter.

The at least one component may comprise a mechanical structure configured to adjust K by setting or varying a minimum distance between a transmit coil of the wireless power transmitter and a receive coil of the wireless power receiver.

Some embodiments relate to a wireless power transmitter or a wireless power receiver comprising the at least one component.

Some embodiments relate to a method of controlling a wireless power transmitter or a wireless power receiver. The method includes adjusting a coupling coefficient K between the wireless power transmitter and the wireless power receiver, a loaded quality factor Q of the wireless power receiver, or both, such that K times Q is less than a constant.

The method may further comprise measuring an electrical characteristic of the wireless power receiver, wherein Q is adjusted based on the electrical characteristic.

The electrical characteristic may comprise a current measurement, a voltage measurement, an impedance measurement and/or a resistance measurement.

Q may be adjusted by adjusting a capacitance, inductance and/or resistance of the wireless power receiver.

The capacitance may be adjusted by controlling a variable capacitance of the wireless power receiver.

The inductance may be adjusted by controlling a variable inductance of the wireless power receiver.

The resistance may be adjusted by controlling a variable resistance of the wireless power receiver.

The constant may be between 0.8 and 1.0, inclusive.

K, Q or both may be adjusted such that a transfer function from the wireless power transmitter to the wireless power receiver is monotonic within a range of drive frequencies of the wireless power transmitter.

K may be adjusted by setting or varying a minimum distance between a transmit coil of the wireless power transmitter and a receive coil of the wireless power receiver.

Some embodiments relate to wireless power transfer system including a wireless power transmitter and a wireless power receiver. The wireless power transmitter, the wireless power receiver or both the wireless power transmitter and the wireless power receiver are configured to maintain a product of the coupling coefficient K between the wireless power transmitter and the wireless power receiver and a loaded quality factor Q of the wireless power receiver to be less than a constant.

The constant may be between 0.8 and 1.0.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION

Figure 1:
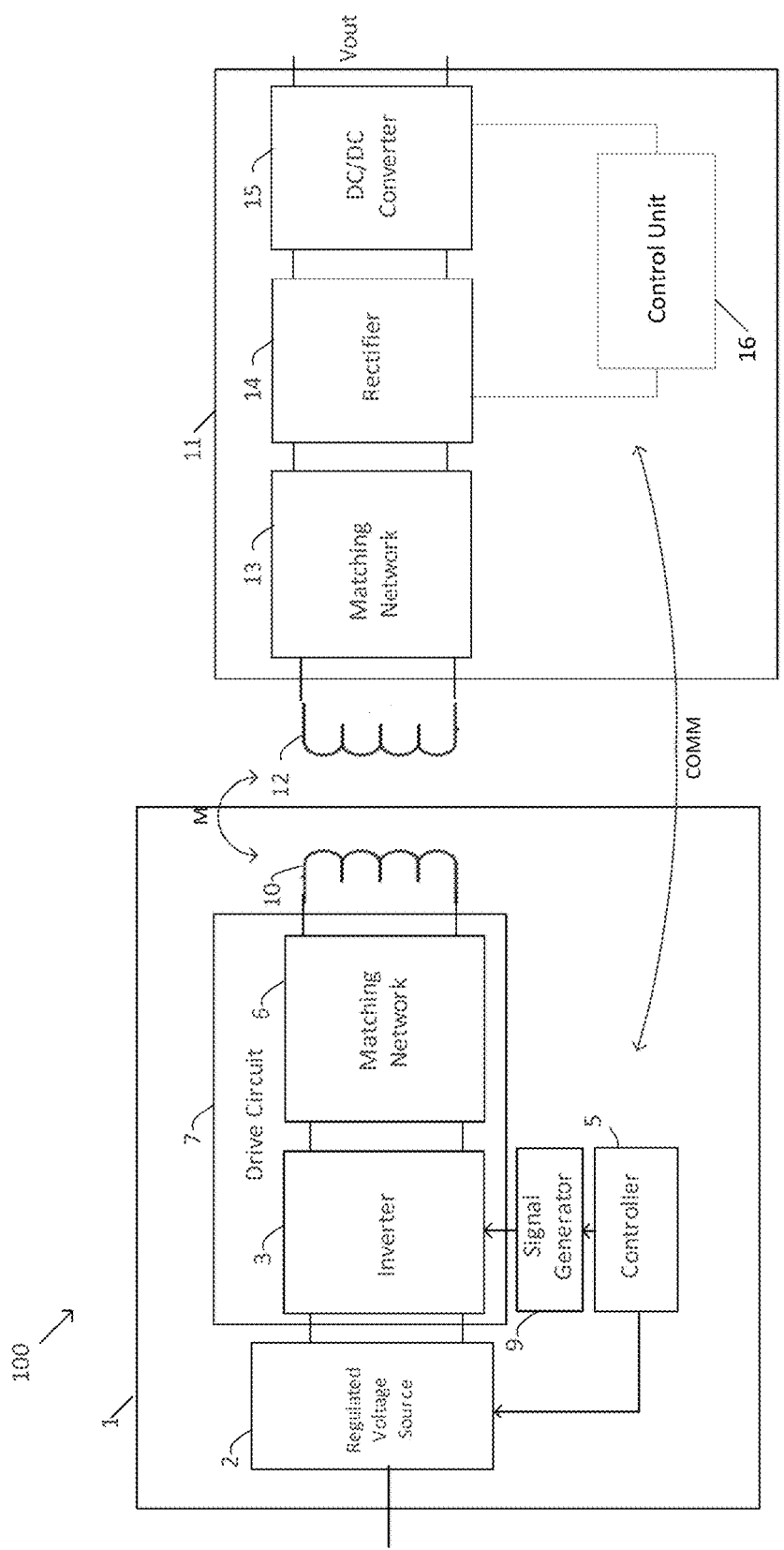
FIG. 1 shows a wireless power transfer system.

In a WPTS the wireless power transmitter and wireless power receiver can be inductively coupled to one another. Due to the spacing between them, the coil geometry and/or placement, they may be loosely coupled to one another, i.e., the coupling coefficient may be relatively low. The load impedance seen by the wireless power transmitter may vary across a wide range as the spacing and/or placement of the wireless power receiver or the load seen by the wireless power receiver changes, due at least in part to changes in coupling. For example, the load impedance seen by the wireless power transmitter may vary if multiple receivers are placed near the transmitter, or as the depletion level of a battery charged by the transmitter varies, or if the charging rate of the battery changes.

The transfer function of a WPTS describes the power transferred over a frequency range. The magnitude of the transfer function may have a peak at a resonant frequency of the system. It may be desirable to operate the system at a frequency higher than the resonant frequency. This method of operation has benefits related to soft switching in semiconductor devices in practical systems, which reduces the power loss during the switching of switches within the WPTS. In some embodiments, assuming that the transfer function is monotonic at frequencies higher than the resonant frequency, the closer the drive signal frequency is to the system resonant frequency, the higher the transferred power may be. The farther away from the resonant frequency F0, the lower the transferred power. In practical WPTS, the drive frequency is varied between a high operating frequency, F2, and a low operating frequency, F1. This may allow for fine control of the quantity of power transferred by the WPTS by adjusting the frequency at which power is transferred. However, the inventor has recognized that in certain combinations of loading and/or coupling the transfer function can become non-monotonic above the resonant frequency, exhibiting resonance peak splitting; the resonant frequency may be change to be substantially higher than F0. It may be undesirable to operate at a frequency above the maximum of the transfer function, as the frequency control method may no longer work effectively to control the transferred power. When the transfer function is non-monotonic above the resonant frequency, the WPTS operating range may be reduced to be between the maximum of the transfer function and the high operating frequency F2. Additionally, the range of power levels capable of being transferred may shrink as the non-monotonic behavior lowers the local maximum of the transfer function. Either of these two effects may prevent the system from reaching a desired power level in the specified operating frequency range. The techniques described herein allow for the wireless power transfer system to operate in a designated frequency range and to achieve desired levels of power transfer. The inventor has appreciated system parameters which ensure that the transfer function is monotonic across the operating frequency range, and has developed techniques to adjust one or more parameters of the system to maintain monotonic behavior of the transfer function. According to some embodiments, such techniques entail adjusting one or more system parameters to maintain a relationship between the coupling coefficient of the transmitter and receiver coils and the loaded quality factor of the receiver coil.

FIG. 1 shows a block diagram of a wireless power system 100 including a wireless power transmitter 1 and a wireless power receiver 11. The wireless power transmitter 1 has a drive circuit 7 including an inverter 3 that drives a transmit coil 10 through a matching network 6. The wireless power transmitter 1 may include a regulated voltage source 2 (e.g., a voltage regulator) that provides a regulated DC voltage to the inverter 3. The regulated voltage source 2 produces a regulated DC output voltage in response to control stimulus from the controller 5. In some embodiments, the drive circuit 7 may be a soft-switched power converter, such as a class E amplifier that converts the DC voltage at the input of inverter 3 into an AC output voltage to drive the transmit coil 10. Producing an AC output voltage enables wireless power transmission through electromagnetic induction. The controller 5 may control a signal generator 9 to drive the inverter 3 with signals of a selected wireless power transmission frequency. As an example, the inverter 3 may be switched at a frequency between 100 and 205 kHz to transmit power to a wireless power receiver designed to receive wireless power according to the Qi specification for low power Qi receivers and 80-300 kHz for medium power Qi receivers. The inverter 3 may be switched at a higher frequency, such as a frequency of greater than 1 MHz, within an ISM band, e.g., 6.765 MHz to 6.795 MHz, to transmit power to a receiver designed to receive wireless power using MR technology. However, these frequencies are described merely by way of example, as wireless power may be transmitted at a variety of suitable frequencies, in accordance with any suitable specification. Controller 5 may be an analog circuit, a digital circuit or a combination thereof. Controller 5 may be programmable, and may command signal generator 9 to produce signals at a desired transmission frequency based on stored program instructions, so that inverter 3 switches at the desired transmission frequency. Matching network 6 may facilitate wireless power delivery by presenting a suitable impedance to the inverter 3. The matching network(s) may have one or more capacitive or inductive elements or any suitable combination of capacitive and inductive elements. Since the transmit coil 10 may have an inductive impedance, in some embodiments the matching network 6 may include one or more capacitive elements, which, when combined with the impedance(s) of the transmit coil 10, presents an impedance to the output of inverter 3 suitable for driving the transmit coil 10. In some embodiments, during wireless power transfer the resonant frequency of the matching network 6 may be equal to or approximately equal to the switching frequency of the inverter 3. The transmit coil 10 may be realized by any suitable type of conductors. The conductors may be wires, including solid wire or Litz wire, or patterned conductors, such as patterned conductors of a PC board or an integrated circuit.

The AC current in the transmit coil 10 generates an oscillating magnetic field in accordance with Ampere's law. The oscillating magnetic field induces an AC voltage into a receiver coil 12 of the wireless power receiver 11 in accordance with Faraday's law. The AC voltage induced in the receiver coil 12 is provided through a matching network 13 to a rectifier 14 that generates an unregulated DC voltage. Rectifier 14 may be a synchronous rectifier or may be implemented using diodes. The unregulated DC voltage is regulated using a DC/DC converter 15, the output of which may be filtered and provided to a load as output voltage Vout. In some embodiments, the DC/DC converter 15 can be a linear regulator, buck regulator, boost regulator, flyback regulator or any other suitable converter. Control unit 16 may be an analog circuit, a digital circuit or a combination thereof, it may also be programmable. In some embodiments control unit 16 may be within the rectifier 14, or the DC/DC converter 15, or split into multiple components. In some embodiments control unit 16 may be between rectifier 14 and DC/DC converter 15.

Figure 2:
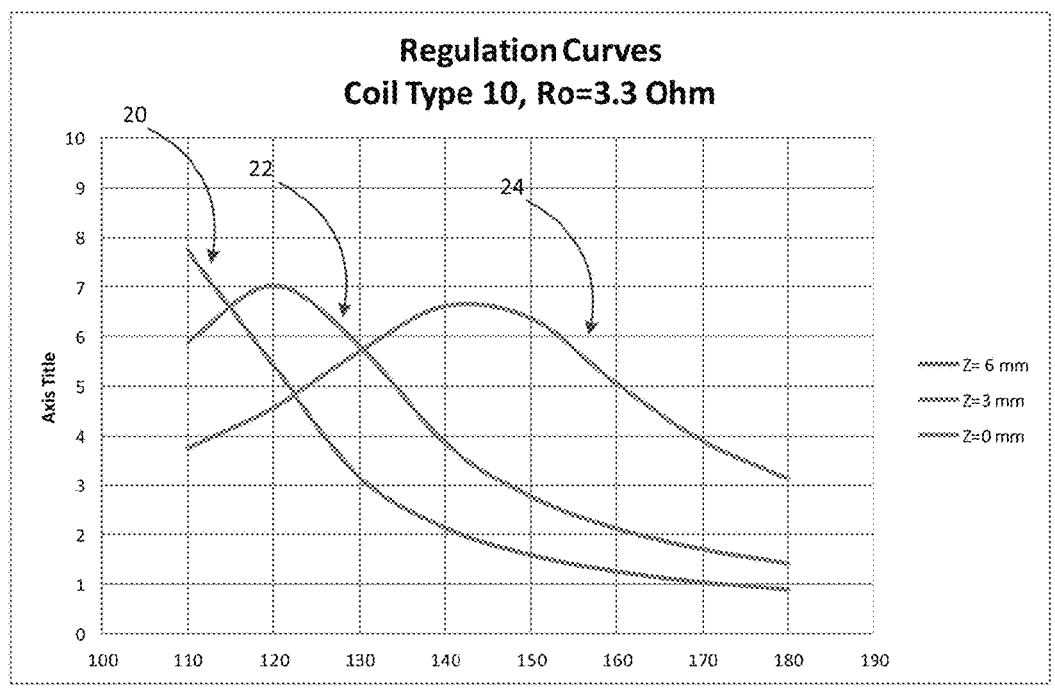
FIG. 2 shows a plurality of transfer functions, some of which exhibit non-monotonic behavior.

The operation of wireless power system 100 may be constrained by the characteristics of a transfer function of the system, as described above. FIG. 2 shows a plot of the magnitude response of three transfer functions corresponding to three different spacings between the transmit and receive coils. The plot has frequency in kilohertz on the x-axis and transfer function magnitude on the y-axis. The transfer function curves are shown, using the same type of coil for both coils 10 and 12, and a load of 3.3 Ohms at the wireless power receiver. Curve 20 shows the transfer function with a coil separation of 6 mm. Curve 22 shows the transfer function with a coil separate of 3 mm. Curve 24 shows the transfer function with a coil separation of 0 mm.

As can be seen, curve 20 is monotonic, and curves 22 and 24 are non-monotonic, over the frequency range of interest. As shown in FIG. 2, the transfer function of the system may become non-monotonic as the transmit and receive coils are brought closer together, which increases the coupling between them. For a desired operating range of 110 kHz to 180 kHz, curve 20 may be a suitable transfer function, as it exhibits monotonic behavior through the entire frequency range. However, curves 22 and 24 are non-monotonic over the frequency range, and have resonant frequencies within the range at approximately 120 kHz and 145 kHz respectively. As a result, with curves 22 and 24, adjusting the driver frequency of the system using typical frequency control techniques may not lead to the desired adjustment in power transfer below resonance. If the restriction of operating only to the right of resonance is maintained in either of those two cases, then the output power range may be restricted. Restricting the power range may limit both the maximum power that may be delivered as well as the control of the amount of power delivered, since the output power range narrows as well as the operating frequency range as the coupling between the coils is increased. The magnitude ranges of curves 22 and 24 are both smaller than the magnitude range of curve 20, leading to a limited control of the power transfer, and a reduced power transfer maximum. It should be noted that while this example shows the coil separation as creating non-monotonic behavior in the transfer function over the operating range, there are other factors that may create non-monotonic transfer functions, as discussed below.

Figure 3:
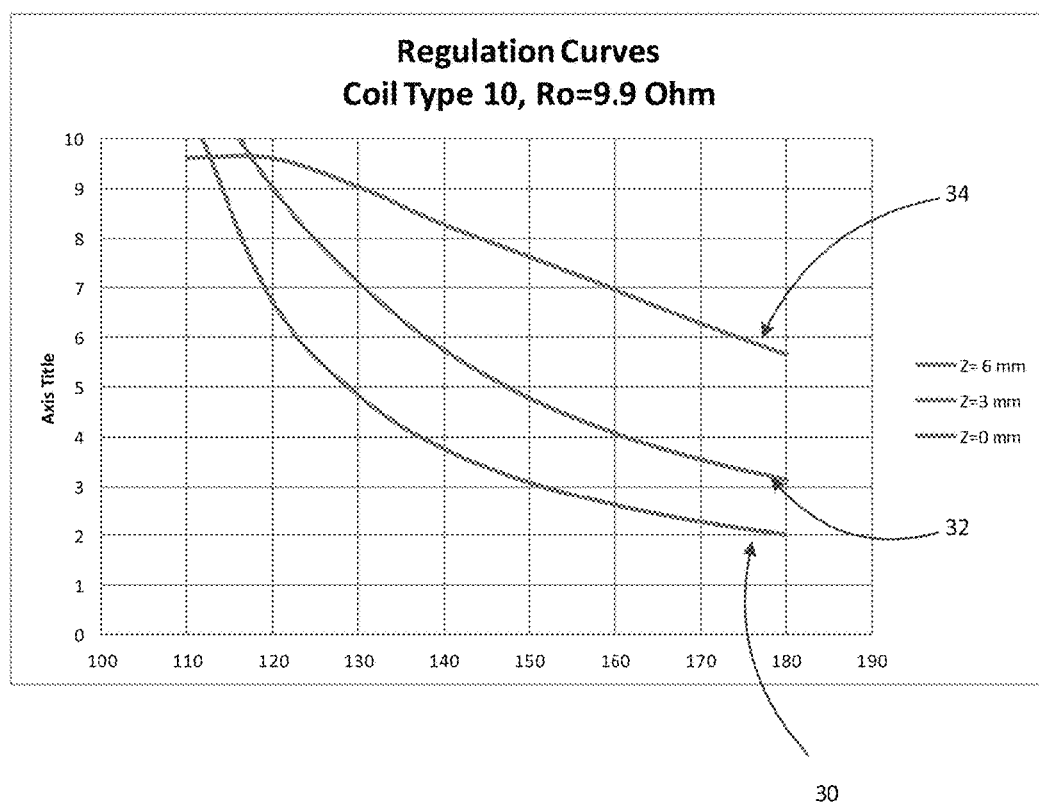
FIG. 3 shows a plurality of transfer functions, all of which exhibit monotonic behavior.

FIG. 3 illustrates the effect on the transfer functions of FIG. 2 when the load condition is decreased by increasing Ro from 3.3 Ohms to 9.9 Ohms, using the same separation distances between the transmit coil and the receive coil. As can be seen in FIG. 3, decreasing the load condition by increasing Ro causes all of the transfer functions to be monotonic. FIG. 3 shows a plurality of transfer functions, all of which exhibit monotonic behavior. As with FIG. 2, the plot has frequency in kilohertz on the x-axis and transfer function magnitude on the y-axis. The transfer function curves are shown, using a standard coil type for both coils 10 and 12, and a load of 9.9 Ohms. Curve 30 is a monotonic transfer function of the system, when the coil separation is approximately 6 mm. Curve 32 is a monotonic transfer function of the system, when the coil separation is approximately 3 mm. Curve 34 is a monotonic transfer function of the system, when the coil separation is approximately 0 mm. All three curves exhibit monotonic behavior over the entire operating range, in this case 110 kHz to 180 kHz. The operating range should not be considered a limitation of the present invention, and serves only to illustrate one example of monotonic behavior in a transfer function of a WPTS. As discussed below, increasing Ro decreases the loaded quality factor Q. Decreasing the loaded quality factor Q can cause the transfer function to change from non-monotonic over the frequency range of interest to monotonic.

The inventor has recognized that certain system criteria may be selected or controlled to keep the transfer function monotonic within the operating range. Specifically, the inventor has recognized that the transfer function will be monotonic within the operating range as long as the product of the coupling coefficient K between the primary and secondary coils, and the quality factor Q of the loaded secondary coil does not exceed a constant. In equation form, $$K\max * Q < C$$

where, C is a constant. In some embodiments, C may be 1, or 0.8, a value between 1 and 0.8, or another suitable value. As long as the equation is satisfied, the transfer function of the WPTS will be monotonic above resonance. Designing or controlling a wireless power transfer system such that the above equation is satisfied allows the transfer function to be monotonic for any expected loading, coupling and coil separation conditions. K and Q may be designed to satisfy this condition, or they may be controlled to maintain the relationship. Either K or Q may be adjusted to maintain the relationship, or both may be adjusted.

Control of K and/or Q may occur through a variety of implementations. K is determined through physical dimensions and relationships, while Q is primarily determined through electrical relationships. Q may be expressed as $$Q = \frac{\sqrt{\frac{Ls}{Cs}}}{R_O + r} = \frac{\omega Ls}{R_O + r}$$

where Ls is the inductance of the receiver 11, Cs is the capacitance of the receiver 11, Ro is the apparent resistance of the receiver, and r is the parasitic resistance of the receiver 11. Any of these variables may be used to control Q to establish or maintain the monotonic behavior of the transfer function of the WPTS.

Figure 4:
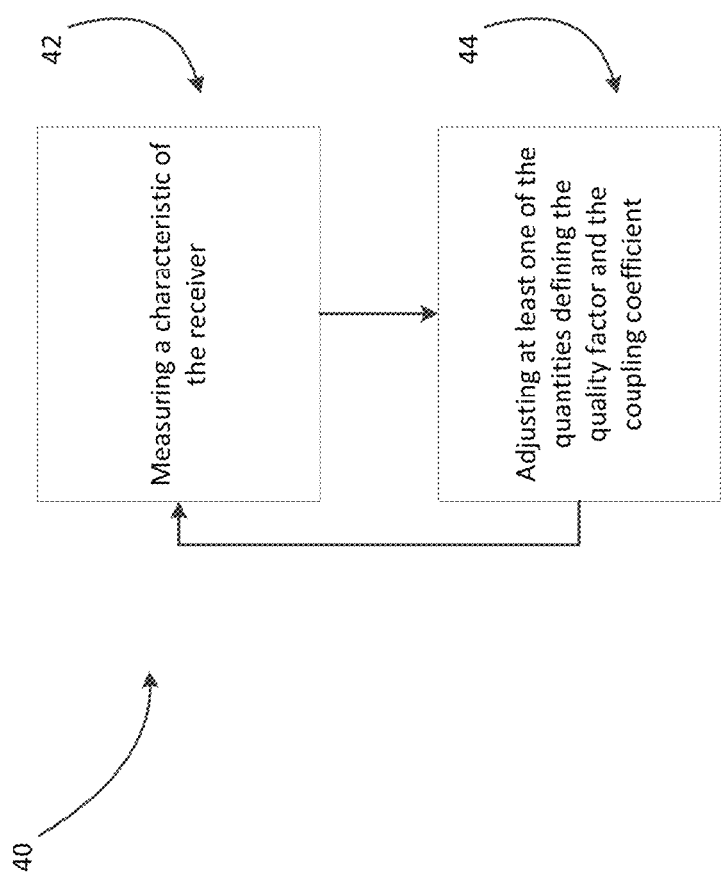
FIG. 4 is a flowchart for a method of maintaining monotonic behavior of a transfer function.
Figure 5:
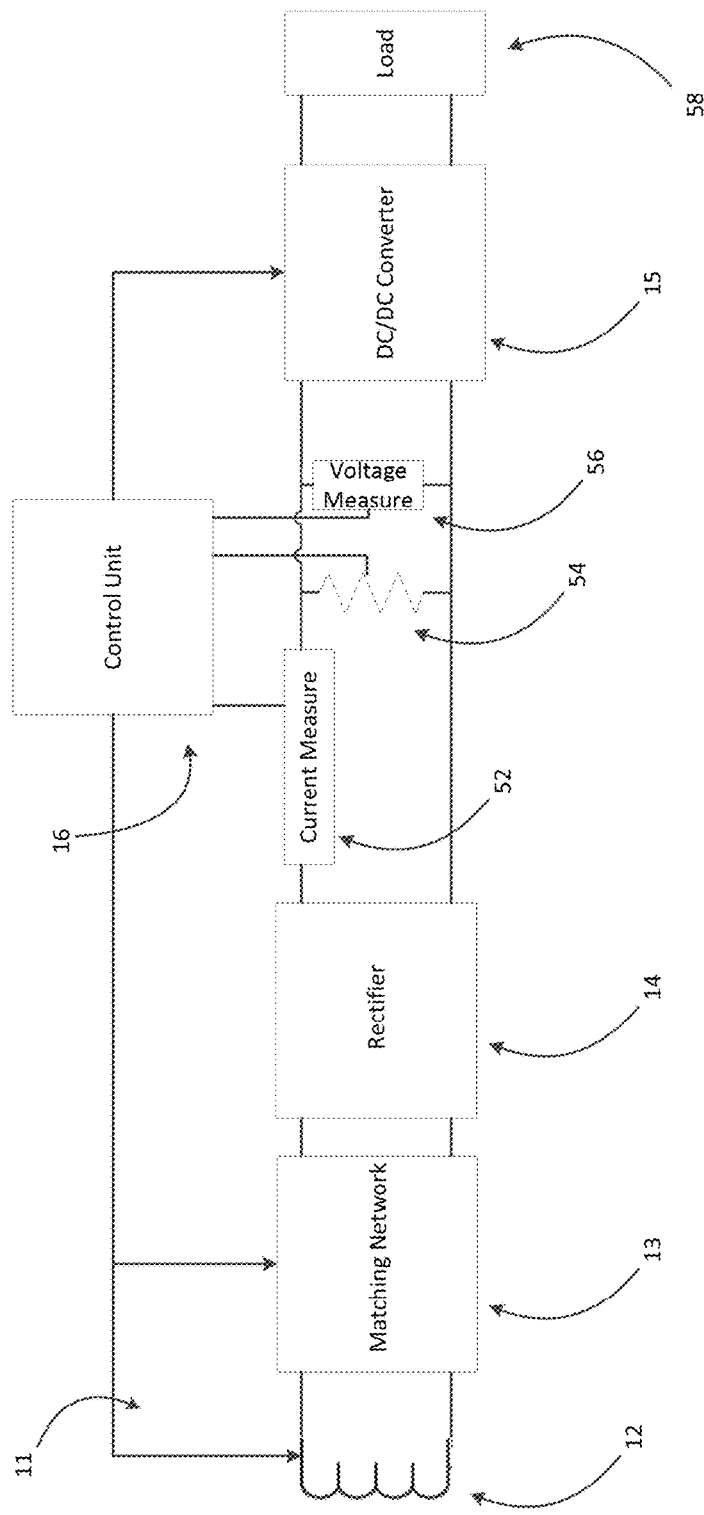
FIG. 5 shows one embodiment of a receiver for a wireless power transfer system.

A method to maintain the relationship described above, through control of K or Q, will now be discussed. FIG. 4 is a flowchart for a method 40 of maintaining monotonic behavior of a transfer function. The method 40 may comprise an Act 42, which includes measuring a characteristic of the receiver 11. The characteristic may be a current and/or voltage, as shown in FIG. 5, or another suitable characteristic of the signal at the receiver 11. Act 44 may comprise adjusting at least one of the quantities defining the quality factor Q and the coupling coefficient K, so that the product of Q and K may be below a constant C. The process may occur multiple times over the course of the wireless power transfer to ensure that the transfer function stays monotonic over the course of the wireless power transfer, or it may occur only once during the wireless power transfer. In some embodiments, the method of FIG. 4 may be performed by control unit 16 and/or controller 5.

Applying the techniques discussed above to a wireless power receiver circuit will now be discussed. FIG. 5 shows one embodiment of a wireless power receiver 11 for a wireless power transfer system. The wireless power receiver 11 may comprise a receiver coil 12, a matching network 13, a rectifier 14, a DC/DC converter 15, and a control unit 16 capable of performing in-band or out-of-band communication with the wireless power transmitter, as described above. The receiver 11 may additionally comprise a current measurement device 52, a voltage measurement device 56, a resistive impedance, 54, and a load 58. In some embodiments, the current measurement device 52 and/or the voltage measurement device 56 may be part of the control unit 16. In some embodiments, the resistive impedance 54 may be a representation of the equivalent resistance of the DC/DC converter 15 and the load 58, and not an actual circuit component, thus representing Ro in the equation above. In some embodiments, only one of the current measurement device 52 and the voltage measurement device 56 may be needed, or any other measurement device may be used that is suitable for measuring a characteristic of the signal through the receiver 11. In some embodiments the control unit 16 uses measurements from measurement devices 52 and/or 56 to change operating conditions of the DC/DC converter 15 in a way that equivalent loading 54 of the rectifier 14 is dynamically adjusted with the techniques described above to a maintain monotonic transfer function of the wireless power system. For example, in case of a DC/DC converter 15 being a buck converter, if as a result of measurements of measurement devices 52, 56 the equivalent impedance 54 is estimated of being too low to satisfy criterion Q*Ro>const, the control unit 16 via in-band or out-of-band communication can request an increase of the rectifier output voltage and also can control the duty factor of the converter 15 to be reduced so the output of the receiver does not change.

Figure 6:
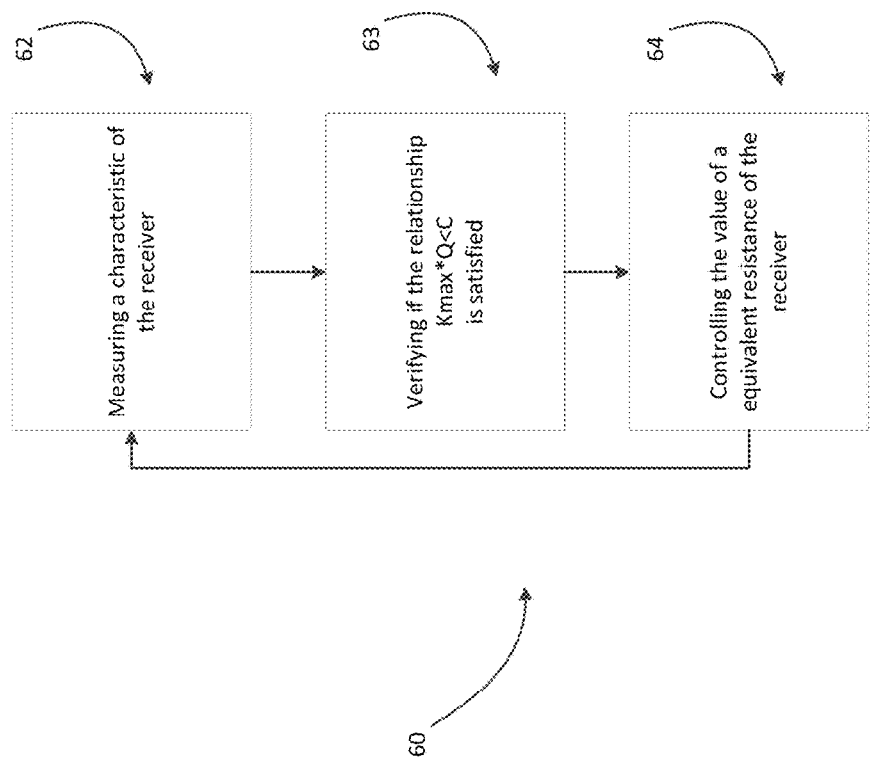
FIG. 6 is a flowchart for a method of controlling the value of a resistance of a receiver to maintain monotonic behavior of a transfer function.

In one embodiment, Q may be controlled through the method of FIG. 6, by adjusting Ro. This embodiment may be used either alone or in combination with any of the other control schemes described herein. In this embodiment, resistor 54 may be an adjustable impedance unit, such as a variable resistor or a bank of switchable resistors, or a representation of the equivalent resistance of the rest of the receiver 11 as described above. In act 62, a characteristic of the receiver, such as voltage or current of the signal, may be measured. In act 63, the product of Kmax and Q can be verified to be less than the constant C. In act 64, the controller 16 may control the value of resistor 54, such that the product of the quality factor and the coupling coefficient remains below a constant. The control of the value of resistor 54 may be direct, if resistor 54 is an adjustable impedance unit, or may occur through the control of the current or voltage flowing out of rectifier 14 to alter the equivalent resistance 54. The output voltage remains approximately constant due to the DC/DC converter 15, which can mitigate the variations in voltage and/or current caused by adjusting the value or Ro.

Figure 7:
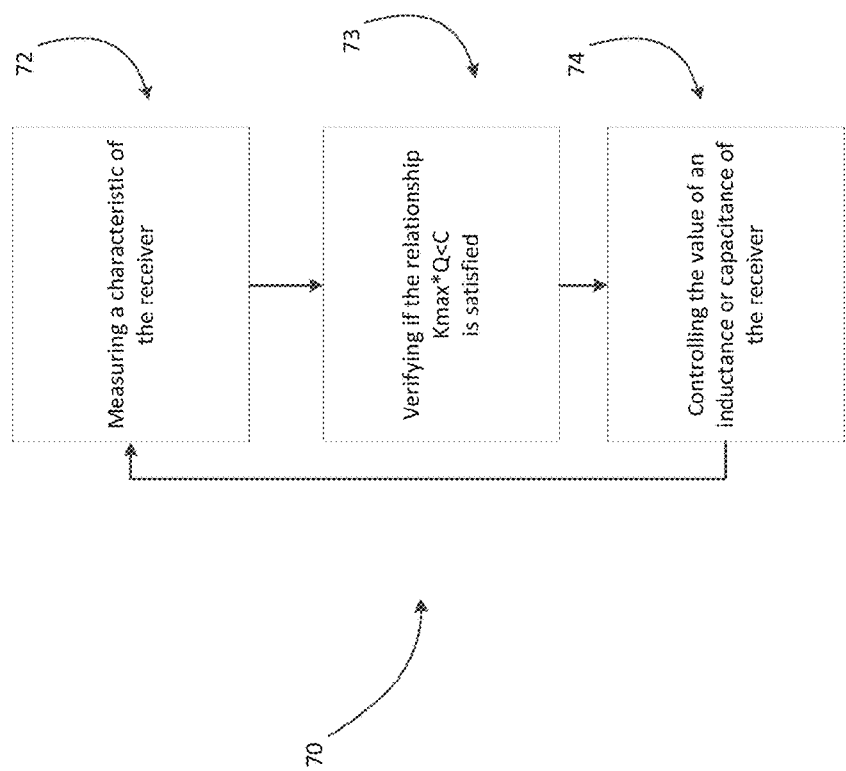
FIG. 7 is a flowchart for a method of controlling the value of an inductance or capacitance of a receiver to maintain monotonic behavior of a transfer function.

In one embodiment, Q may be controlled through the method of FIG. 7, by adjusting C and/or L. This embodiment may be used in combination with any of the other control schemes described. C and/or L may be controlled in a variety of ways. C may be adjusted by controlling a frequency dependent capacitor, voltage dependent capacitor, switchable capacitor bank, or any other component with adjustable capacitance. Similarly, L may be adjusted by controlling any variable or switchable inductive component, or an adjustable tapping of the receiver coil 12. In act 72, a characteristic of the receiver, such as voltage or current of the signal, may be measured. In act 73, the product of Kmax and Q can be verified to be less than the constant C. In act 74, the controller 16 may control the value of L or C, such that the product of the quality factor and the coupling coefficient remains below a constant.

Figure 8:
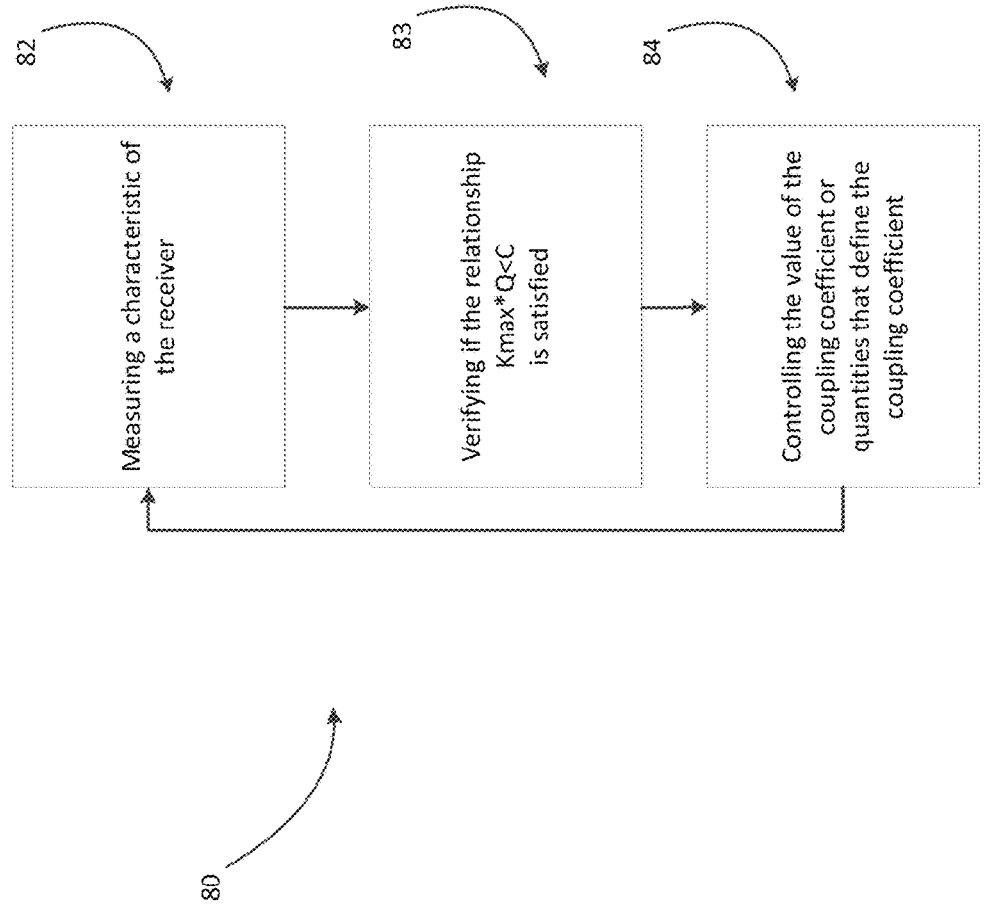
FIG. 8 is a flowchart for a method of controlling the value of a coupling coefficient of a receiver to maintain monotonic behavior of a transfer function.

In one embodiment, K may be controlled through the method of FIG. 8. This embodiment may be used in combination with any of the other control schemes described. In act 82, a characteristic of the receiver, such as voltage or current of the signal, may be measured. In act 83, the product of Kmax and Q can be verified to be less than the constant C. In act 84, the controller 16 may control the value of K. K may be controlled in a variety of ways, such as through a mechanical system regulating the coupling distance between the receiver coil 12 and transmitter coil 10. The mechanical system may use a standoff distance to enforce a certain minimum spacing, keeping K below a maximum.

Figure 9:
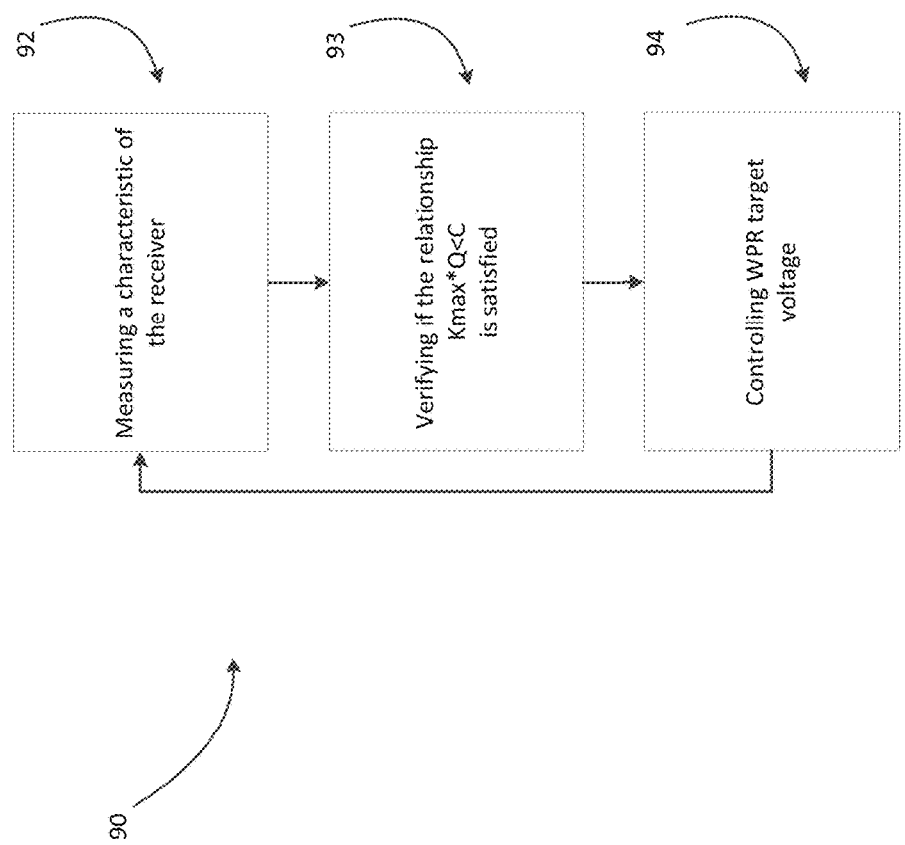
FIG. 9 is a flowchart for a method of controlling the target voltage of a wireless power receiver to maintain monotonic behavior of a transfer function.

In one embodiment, the wireless power receiver target voltage may be controlled through the method of FIG. 9. This embodiment may be used in combination with any of the other control schemes described. In act 92, a characteristic of the receiver, such as voltage or current of the signal, may be measured. In act 93, the product of Kmax and Q can be verified to be less than the constant C. In act 94, the controller 16 may control the target voltage of the wireless power receiver. For example, if the wireless power transfer system is operating with control in a closed loop, the rectifier output voltage may be the voltage that is controlled by the closed loop. The nominal (set) voltage of the rectifier output voltage may be termed a "target voltage," as the control loop controls the output voltage of the rectifier so that it becomes equal to the target voltage.

Figure 10:
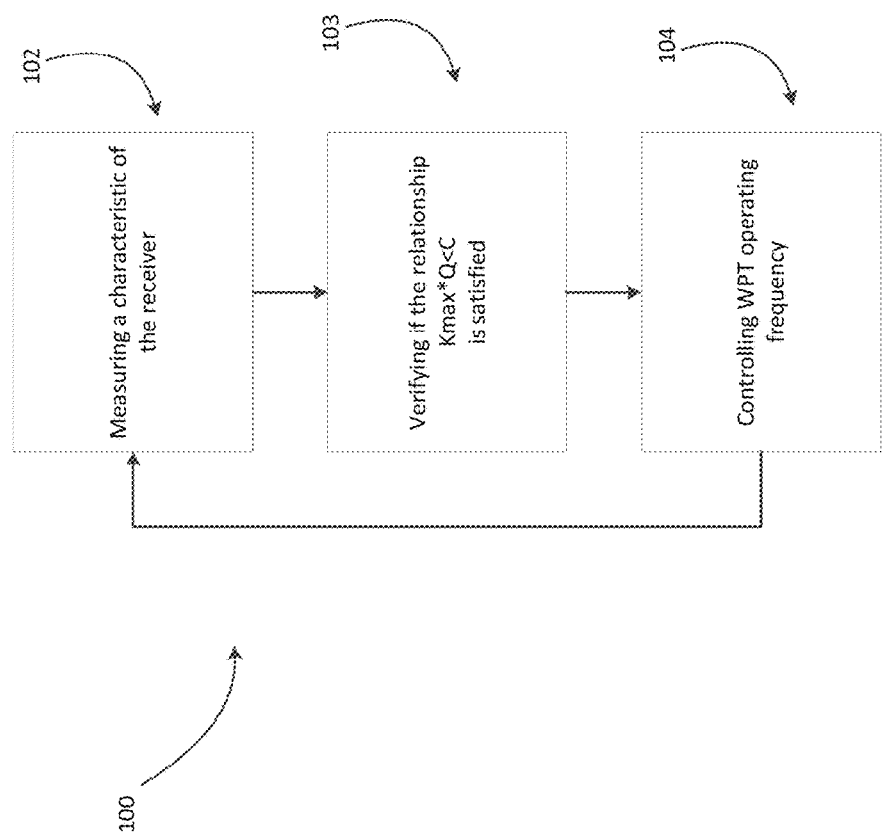
FIG. 10 is a flowchart for a method of controlling the transmitter operating frequency to maintain monotonic behavior of a transfer function.

In one embodiment, the wireless power transmitter operating frequency may be controlled through the method of FIG. 10. This embodiment may be used in combination with any of the other control schemes described. In act 102, a characteristic of the receiver, such as voltage or current of the signal, may be measured. In act 103, the product of Kmax and Q can be verified to be less than the constant C. In act 104, the controller 5 may control the operating frequency of the wireless power transmitter with or without use of in-band or out-of-band communication link with the controller 16.

As discussed above, a wireless power transmitter may be controlled using controller 5 and a wireless power receiver may be controlled using a control unit 16, both of which may be implemented by any suitable type of circuitry. For example, the controller 5 or the control unit 16 may be implemented using hardware or a combination of hardware and software. When implemented using software, suitable software code can be executed on any suitable processor (e.g., a microprocessor) or collection of processors. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments described herein comprises at least one computer-readable storage medium (e.g., RAM, ROM, EEPROM, flash memory or other memory technology, or other tangible, non-transitory computer-readable storage medium) encoded with a computer program (i.e., a plurality of executable instructions) that, when executed on one or more processors, performs the above-discussed functions of one or more embodiments. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques discussed herein.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. At least one component for a wireless power transmitter or a wireless power receiver, the at least one component comprising:
   a mechanical structure and/or circuitry configured to maintain and/or adjust a coupling coefficient K between the wireless power transmitter and the wireless power receiver, a loaded quality factor Q of the wireless power receiver, or both, such that K times Q is less than a constant,
   wherein the constant is between 0.8 and 1.0, inclusive.

2. The at least one component of claim 1, wherein the at least component comprises circuitry configured to measure an electrical characteristic of the wireless power receiver and to adjust Q based on the electrical characteristic.

3. The at least one component of claim 2, wherein the circuitry comprises a current measurement device, a voltage measurement device, or both.

4. The at least one component of claim 1, wherein the at least one component comprises circuitry that is configured to adjust Q by adjusting a capacitance, inductance, equivalent resistance, and/or loading of the wireless power receiver.

5. The at least one component of claim 4, wherein the circuitry is configured to adjust the capacitance by controlling a variable capacitance of the wireless power receiver.

6. The at least one component of claim 4, wherein the circuitry is configured to adjust the inductance by controlling a variable inductance of the wireless power receiver.

7. The at least one component of claim 4, wherein the circuitry is configured to adjust the equivalent resistance by controlling a variable equivalent resistance of the wireless power receiver.

8. The at least one component of claim 4, wherein the circuitry is configured to adjust an operating frequency of the wireless power transmitter.

9. The at least one component of claim 1, wherein the mechanical structure and/or circuitry is configured to maintain and/or adjust K, Q or both such that a transfer function from the wireless power transmitter to the wireless power receiver is monotonic within a range of drive frequencies of the wireless power transmitter.

10. The at least one component of claim 1, wherein the at least one component comprises a mechanical structure configured to adjust K by setting or varying a distance between a transmit coil of the wireless power transmitter and a receive coil of the wireless power receiver.

11. A wireless power transmitter or a wireless power receiver comprising the at least one component of claim 1.

12. A method of controlling a wireless power transmitter or a wireless power receiver, the method comprising:
    adjusting a coupling coefficient K between the wireless power transmitter and the wireless power receiver, a loaded quality factor Q of the wireless power receiver, or both, such that K times Q is less than a constant,
    wherein the constant is between 0.8 and 1.0, inclusive.

13. The method of claim 12, further comprising measuring an electrical characteristic of the wireless power receiver, wherein Q is adjusted based on the electrical characteristic.

14. The method of claim 13, wherein the electrical characteristic comprises a current measurement, a voltage measurement, an impedance measurement and/or a resistance measurement.

15. The method of claim 12, wherein Q is adjusted by adjusting a capacitance, inductance and/or equivalent resistance of the wireless power receiver.

16. The method of claim 15, wherein the capacitance is adjusted by controlling a variable capacitance of the wireless power receiver.

17. The method of claim 15, wherein the inductance is adjusted by controlling a variable inductance of the wireless power receiver.

18. The method of claim 15, wherein the equivalent resistance is adjusted by controlling a variable equivalent resistance of the wireless power receiver.

19. The method of claim 12, wherein K, Q or both are adjusted such that a transfer function from the wireless power transmitter to the wireless power receiver is monotonic within a range of drive frequencies of the wireless power transmitter.

20. The method of claim 12, wherein K is adjusted by setting or varying a distance between a transmit coil of the wireless power transmitter and a receive coil of the wireless power receiver.

21. The method of claim 12, wherein the adjusting comprises adjusting Q by adjusting a capacitance, inductance, equivalent resistance, and/or loading of the wireless power receiver.

22. The method of claim 21, comprising adjusting an operating frequency of the wireless power transmitter.

23. A wireless power transfer system, comprising:
a wireless power transmitter; and
a wireless power receiver,
wherein the wireless power transmitter, the wireless power receiver or both the wireless power transmitter and the wireless power receiver are configured to maintain a product of a coupling coefficient K between the wireless power transmitter and the wireless power receiver and a loaded quality factor Q of the wireless power receiver to be less than a constant,
wherein the constant is between 0.8 and 1.0, inclusive.

* * * * *